United States Patent
Oladeji (12) 
(10) Patent No.: US 9,017,777 B2
(45) Date of Patent: Apr. 28, 2015

(54) INORGANIC FILMS USING A CASCADED SOURCE FOR BATTERY DEVICES

(71) Applicant: QuantumScape Corporation, San Jose, CA (US)

(72) Inventor: Isaiah O. Oladeji, Gotha, FL (US)

(73) Assignee: QuantumScape Corporation, San Jose, CA (US)

( * ) Notice: Subject to any disclaimer, the term of this patent is extended or adjusted under 35 U.S.C. 154(b) by 101 days.

(21) Appl. No.: 13/777,602

(22) Filed: Feb. 26, 2013

(65) Prior Publication Data

US 2014/0242293 A1 Aug. 28, 2014

(51) Int. Cl.
*B06B 1/20* (2006.01)
*C23C 18/12* (2006.01)
*H01M 4/04* (2006.01)
*H01M 4/139* (2010.01)
*H01M 10/052* (2010.01)
*H01M 10/0562* (2010.01)

(52) U.S. Cl.
CPC ........... *C23C 18/125* (2013.01); *C23C 18/1258* (2013.01); *C23C 18/1295* (2013.01); *H01M 4/0428* (2013.01); *H01M 4/139* (2013.01); *H01M 10/052* (2013.01); *H01M 10/0562* (2013.01)

(58) Field of Classification Search
USPC .......................................................... 427/600
See application file for complete search history.

(56) References Cited

U.S. PATENT DOCUMENTS

| | | |
|---|---|---|
| 7,793,611 B2 | 9/2010 | Oladeji |
| 8,225,744 B2 | 7/2012 | Oladeji |
| 2006/0036474 A9 * | 2/2006 | Brugger et al. .................... 705/5 |
| 2008/0238294 A1 * | 10/2008 | Xu et al. ........................ 313/498 |
| 2008/0283048 A1 * | 11/2008 | Petersen .................. 128/200.14 |
| 2008/0299703 A1 * | 12/2008 | Oladeji ......................... 438/104 |
| 2011/0027940 A1 * | 2/2011 | Oladeji ......................... 438/104 |
| 2011/0171398 A1 * | 7/2011 | Oladeji ......................... 427/475 |
| 2011/0171528 A1 | 7/2011 | Oladeji |

* cited by examiner

*Primary Examiner* — Nathan Empie
(74) *Attorney, Agent, or Firm* — Kilpatrick Townsend & Stockton LLP (57) ABSTRACT

A method for manufacturing thin films for a battery device. The method includes vaporizing a precursor material from a liquid source to form droplets ranging from, for example, about 10 microns to about 20 microns. Thereafter, the method includes subjecting the droplets from about 10 to about 20 microns to a megasonic energy source to cause formation of a plurality of smaller droplets ranging from, for example, about 0.25 micron to about 5 microns which are then directed to a heated substrate, where through a heterogeneous reaction a film of material overlying the surface region is formed. The method includes irradiating (e.g., ultra-violet, infra-red, or plasma) the film of material using electromagnetic radiation to process the film to cause a recrystallization of the film to form larger sized crystalline materials. Optionally, the method includes sequentially performing the vaporizing, reacting/releasing, and irradiating to build up a thickness of the film of material.

19 Claims, 4 Drawing Sheets

INORGANIC FILMS USING A CASCADED SOURCE FOR BATTERY DEVICES

CROSS-REFERENCES TO RELATED APPLICATIONS

Not Applicable

BACKGROUND OF THE INVENTION

The present invention relates to a system and method for fabrication of film(s) onto a variety of surfaces with semiconductor materials, metals, or insulators for various applications including electronics. More particularly, the invention pertains to methods for making films for electrochemical cells and other applications.

Numerous coating processes like electroless chemical, chemical vapor, and physical vapor depositions are commonly employed in industrial applications. Physical vapor deposition is commonly used in semiconductor manufacturing applications, often employing expensive vacuum techniques in order to sustain a relatively high film growth rate. Many such processes, while performed at high temperatures (e.g., greater than 300.degree. C.), are non-equilibrium, often resulting in non-stoichiometric proportions. Also, due to the nature of the deposition processes, the deposited films often include relatively high defect densities. In the case of semiconducting devices, such high defect levels can limit electrical performance characteristics. In semiconductor device fabrication wherein p-n junctions are formed in a partial vacuum by depositing one film over a second film or a substrate of different conductivity type, the conventional evaporative and sputtering techniques may provide unsatisfactory film qualities. As an alternative, relatively more expensive techniques such as Chemical Vapor Deposition (CVD), Molecular Beam Epitaxy (MBE), pulsed laser deposition, and atomic layer epitaxy, are useful, especially with formation of III-V compound semiconductor materials, but satisfactory deposition processes have not been available for fabrication of thin film II-VI compound semiconductor materials. An example of a process is described in U.S. Pat. No. 8,225,744, in the name of Oladeji, and issued on Jul. 24, 2012, which is incorporated by reference herein.

The above are expensive vacuum techniques; and the process involved is based mostly on the intermixing of elements constituting the material and subjecting the mixture to high temperature to form the compound. Unfortunately each of the various elemental particles does not have the same surrounding. Hence, small isolated areas will have the right material composition after anneal leading to film with non-uniform stoichiometry. Thus, the process may be good for small area deposition but poor for large area deposition needed for high yield manufacturing.

From the above, it is seen that techniques for depositing high quality films are desirable.

BRIEF SUMMARY OF THE INVENTION

The present invention relates to a system and method for fabrication of film(s) onto a variety of surfaces with semiconductor materials, metals, or insulators for various applications including electronics. More particularly, the invention pertains to methods for making films for electrochemical cells and other applications.

In a specific embodiment, the present invention provides a method for manufacturing thin films for a battery device. The method includes providing a substrate member, which has a surface region. The method includes subjecting the substrate member to a thermal process to increase a temperature of the substrate from a first temperature to a second temperature. The method includes subjecting the substrate member to movement about a center region of the substrate in a variable or constant manner. The method includes vaporizing a precursor material from a liquid source to form droplets ranging from, for example, about 10 microns to about 20 microns. Thereafter, the method includes subjecting the droplets from about 10 to about 20 microns to a megasonic energy source to cause formation of a plurality of smaller droplets ranging from, for example, about 0.25 micron to about 5 micron. In an example, the larger droplets and smaller droplets are formed in series via a cascaded process. The method further includes directing these droplets to the heated substrate, were they are caused to form a film of material overlying the surface region through a heterogeneous reaction. The method also includes releasing any volatile byproducts (e.g., water vapor, CO, $CO_2$, NO, $NO_2$, $C_nH_xO_y$, $C_nH_x$) from the film of material to substantially free the film of material from any of the volatile byproducts. The method includes irradiating (e.g., ultra-violet, infra-red, or plasma) the film of material using electromagnetic radiation (or other thermal treatment process) to process the film to cause a recrystallization of the film to form larger sized crystalline materials. Optionally, the method includes sequentially performing the vaporizing, reacting/releasing, and irradiating to build up a thickness of the film of material.

In an example, the substrate member is selected from a plastic, metallic, semiconductor, insulator, or any combination thereof. In an example, the substrate is moved using a constant rotation or a variable rotation, including combinations thereof. In another example, the substrate is moved linearly through the chamber. In another example, the substrate is not moved. In an example, the formation of the film is provided by a heterogeneous chemical reaction between the smaller particle droplets and a portion of the surface region. In an example, the second temperature is about room temperature to about 300 Degrees Celsius.

In an example, the formation of the film is provided within a low vacuum (760 torr to 1 torr) environment. In an example, the present method can be implemented in a clustertool, or in a modular roll-to-roll tool, or other tool configuration. That is, the vaporizing a precursor material to form droplets ranging from about 10 microns to about 20 microns, and subjecting the droplets from about 10 to about 20 microns to a megasonic energy source to generate 0.25 to 5 microns droplets, that are exposed to the heated substrate to form the film; all these are provided in a first chamber or the first module; irradiating the film of material using electromagnetic radiation to process the film to cause a recrystallization of the film to form larger sized crystalline materials is provided in a second chamber or second module.

In an example, the film of material is for an electrolyte device for a battery device. The electrolyte device is a solid state material, many of which are known in the art. One non-limiting example consists of lithium, (aluminum and/or gallium), sulfur, and phosphate entities (LiAlGaSPO). In an example, the film is of material comprises a CuS, CuZnSnS, $LiCoO_2$, $LiMn_2O_4$, LiMnNiCoAlO, ZnO, ZnS, FeS, iron halide, copper halide, cobalt halide, or metal plus lithium halide, or a diamond like coating. In an example, the film of material has a thickness of 10 nanometers to about 5000 nanometers.

In an example, the vaporizing is provided by a nebulizing nozzle configured with a gas source to facilitate vaporization of the precursor material, and optionally, the method includes directing the vaporized precursor material to a surface coupled to the mega-sonic energy source. In an example, the vaporizing is provided by a nebulizing nozzle configured with a gas source to facilitate vaporization of the precursor material, and optionally, the method includes directing the vaporized precursor material to a cone shaped surface coupled to the mega-sonic energy source. The vaporizing is provided by a nebulizing nozzle configured with a gas source to facilitate vaporization of the precursor material, and optionally, the method includes directing the vaporized precursor material to a cone shaped surface coupled to the mega-sonic energy source and subjecting the resulting smaller droplet particles to a convective force to evenly deposit the film of material overlying the surface region of the substrate member.

In an example, the present invention provides an apparatus for formation of a film of material. The apparatus has a chamber having an interior region, and a susceptor configured within the interior region of the chamber. The apparatus has a workpiece provided on the susceptor and a megasonic energy source configured within the chamber. The apparatus has a nebulizing nozzle configured within the chamber to vaporize a precursor material from a liquid source to form droplets ranging from about 10 microns to about 20 microns; and thereafter subjecting the droplets from about 10 to about 20 microns to the mega-sonic energy source to cause formation of a plurality of smaller droplets ranging from about 0.25 micron to about 5 micron, which are directed to the heated substrate and cause to form a film of material overlying the surface region. The apparatus has an irradiation source configured within the chamber to irradiating the film of material using electromagnetic radiation to process the film to cause a recrystallization of the film to form larger sized crystalline materials.

The present invention achieves these benefits and others in the context of known process technology. However, a further understanding of the nature and advantages of the present invention may be realized by reference to the latter portions of the specification and attached drawings.

BRIEF DESCRIPTION OF THE DRAWINGS

FIG. 1 illustrates schematically the general flow of reagents in accordance with an embodiment of the invention.

FIG. 2 illustrates schematically a vertical section of a turbo-SPEED chamber in accordance with an embodiment of the present invention.

FIG. 3 illustrates schematically a vertical section of nozzle and megasonic nebulizing cascade in accordance with another embodiment of the present invention.

FIG. 4 is a simplified cross-sectional view of a battery device according to an embodiment of the present invention.

DETAILED DESCRIPTION OF THE INVENTION

The present invention relates to a system and method for fabrication of film(s) onto a variety of surfaces with semiconductor materials, metals, or insulators for various applications including electronics. More particularly, the invention pertains to methods for making films for electrochemical cells and other applications.

There has been a need for a wet chemical system that can create high quality films, e.g., semiconductor, dielectric, conductive films, at high formation rates, while providing a relatively uniform film thickness across the entire substrate surface over which the film is formed. In accordance with several embodiments of the invention, such a high quality film is formed by a replacement reaction wherein the system provides a continuous or replenishable supply of chemical processing solution. In several examples, the solution reacts about the surface of a heated substrate. The substrate temperature may be controlled to exhibit a substantially uniform temperature across the surface. That is, temperature differentials along the surface over which the film is formed are limited in order to effect a substantially constant reaction rate along the surface, thereby assuring a relatively uniform film growth rate. Further, the pH and composition of the solution may be continuously monitored and maintained to improve the stability of the process and, hence, the quality of the deposited film, e.g., stoichiometry, defect density, uniformity and consistency of dopant distribution. The system may be operated above atmospheric pressure to increase the rate of film growth or in a slight vacuum, e.g. 1 torr to 1000 torr.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

In a specific embodiment, the present invention provides a method for manufacturing thin films for a battery device, as outlined below.

1. Provide a substrate member, which has a surface region;
2. Subject the substrate member to a thermal process to increase a temperature of the substrate from a first temperature to a second temperature;
3. Subject the substrate member to movement about a center region of the substrate in a variable or constant manner;

4. Vaporize a precursor material from a liquid source to form droplets ranging from, for example, about 10 microns to about 20 microns;
5. Subject the droplets from about 10 to about 20 microns to an mega-sonic energy source;
6. Cause formation of a plurality of smaller droplets ranging from, for example, about 0.25 micron to about 5 micron, which are directed to the heated substrate and react to form a film of material overlying the surface region;
7. Release any volatile byproducts (e.g., water vapor, CO, $CO_2$, NO, $NO_2$, $C_nH_x$) from the film of material to substantially free the film of material from any of the volatile byproducts;
8. Irradiate (e.g., ultra-violet, infra-red) the film of material using electromagnetic radiation to process the film to cause a recrystallization of the film to form larger sized crystalline materials;
9. Sequentially performing the vaporizing, reacting/releasing, and irradiating to build up a thickness of the resulting film of material by formation of multiple overlying films.
10. Perform other steps, as desired.

The above sequence of steps provides a method according to an embodiment of the present invention. In a specific embodiment, the present invention provides a method and resulting high quality film of material. Although the above has been described in terms of a certain sequence of steps, there can be other embodiments using one or more selected process recipes, which have been described in more detail throughout the present specification and more particularly below. Other alternatives can also be provided where steps are added, one or more steps are removed, or one or more steps are provided in a different sequence without departing from the scope of the claims herein.

FIG. 1 illustrates schematically the general flow 100 of reagents in accordance with an embodiment of the invention. As shown, the present invention provides a substrate member, which has a surface region. In an example, the substrate member is selected from a plastic, metallic, semiconductor, insulator, or any combination thereof. In an example, the substrate is moved using a constant rotation or a variable rotation, including combinations thereof.

In a specific embodiment, the present method also includes subjecting the substrate member to a thermal process to increase a temperature of the substrate from a first temperature to a second temperature. The first temperature can range from about 20 degree Celsius to about 300 degree Celsius, but can be others. The temperature source can be conductive, irradiative, or any combination thereof.

In a specific embodiment, the present method includes subjecting the substrate member to movement about a center region of the substrate in a variable or constant manner. As an example, the variable manner is 0 revolution per minute (RPM) to 500 RPM in clockwise direction for 5 to 60 seconds, then 0 RPM to 500 RPM in counterclockwise direction for another 5 to 60 seconds. The constant manner is fixed rotation ranging from 0 to 500 RPM in clockwise or counterclockwise direction. The movement is provided to facilitate deposition of the film of material.

The method includes vaporizing a precursor material from a liquid source to form droplets ranging from, for example, about 10 microns to about 20 microns, but can be others. As an example, the liquid source is deionized water containing water soluble cation salt, anion source, at least two ligands, and about 10 to 20% by water solvent volume of alcohol or methanol to further reduce the solution surface tension for reduced droplet sizes generation. The vaporizing occurs with the help of Burgener Research, Mississauga, Ontario, Canada, nebulizer nozzle that has the solution inlet and a carrier gas inlet; at the outlet of the nozzle the solution gets drawn into the gas stream and gets broken into droplet by the energy of the gas flow. The solution flow ranges from 0.5 ml/minute to 10 ml/minutes, and the gas flows at a pressure ranging between 30 to 50 psi.

The method includes subjecting the droplets from about 10 to about 20 microns to a mega-sonic energy source. The droplets are directed to a cone shaped platform attached to the oscillator, which introduces energy into the droplets to cause formation of a plurality of smaller droplets ranging from, for example, about 0.25 microns to about 5 microns; which are directed to the heated substrate where they react and form a film of material overlying the surface region. In an example, the megasonic is Hielsher USA, Ringwood, N.J. UM20-1.6 megasonic nebulizer.

Similar to ultrasonic nebulizer, megasonics utilizes a transducer, usually composed of piezoelectric crystals, to create a sound field but at higher frequency (typically 0.8-2 MHz compared to 20-200 kHz for ultrasonic cleaning). As a result, the cavitation that occurs is gentler and on a much smaller scale. Megasonics are currently used mainly in the silicon industry.

In an example, megasonics operates at higher frequencies, at least 1000 kHz; it produces controlled cavitation.

In a specific embodiment, the present method includes ceasing the formation of the film, and preferably releasing any volatile byproducts (e.g., water vapor, CO, $CO_2$, NO, $NO_2$, $C_nH_x$, $C_nH_xO_y$) from the film of material to substantially free the film of material from any of the volatile byproducts. An example of an undesirable byproduct includes trapped water vapor, CO, $CO_2$, NO, $NO_2$, $C_nH_x$, $C_nH_xO_y$, as well as others. Generally, if too thick layer is built up and these byproducts are trapped, any further thermal treatment of the film can lead to blister, cracks, and poor film morphology due to violent escape of the hot gases of these by products.

In a specific embodiment the present method includes irradiating (e.g., ultra-violet, infra-red) the film of material using electromagnetic radiation to process the film to cause a recrystallization of the film to form larger sized crystalline materials. The larger crystalline sized material is 0.5 microns to 5 microns, and is often more than 1000 percent larger than the film before recrystallization. Of course there can be variations.

In a specific embodiment, the method repeats the steps above to form multiple layers. That is, the method includes sequentially performing the vaporizing, reacting/releasing, and irradiating to build up a thickness of the resulting film of material by formation of multiple overlying films. Of course, other steps can be included as desirable.

The above sequence of steps provides a method according to an embodiment of the present invention. In a specific embodiment, the present invention provides a method and resulting high quality film of material. Although the above has been described in terms of a certain sequence of steps, there can be other embodiments using one or more selected process recipes, which have been described in more detail throughout the present specification and more particularly below. Other alternatives can also be provided where steps are added, one or more steps are removed, or one or more steps are provided in a different sequence without departing from the scope of the claims herein.

FIGS. 2-3 illustrate schematically some aspects of a Film Growth System (FGS) for conducting aqueous micro-droplets chemical based deposition. This process will be referred to herein as Turbo-vapor Streaming process for Electroless Electrochemical Deposition (Turbo SPEED).

In an example, the present invention provides an apparatus for formation of a film of material. The apparatus has a chamber having an interior region, and a susceptor configured within the interior region of the chamber. The apparatus has a workpiece provided on the susceptor and a megasonic energy source configured within the chamber. The apparatus has a nebulizing nozzle configured within the chamber to vaporize a precursor material from a liquid source to form droplets ranging from about 10 microns to about 20 microns; and thereafter subjecting the droplets from about 10 to about 20 microns to the megasonic energy source to cause formation of a plurality of smaller droplets ranging from about 0.25 microns to about 5 microns that are directed to the heated substrate where they form a film of material overlying the surface region. The apparatus has an irradiation source configured within the chamber to irradiating the film of material using electromagnetic radiation to process the film to cause a recrystallization of the film to form larger sized crystalline materials.

Briefly, some characteristics of Turbo SPEED include the following: A reagent solution containing various metals and nonmetals, and various ligands to improve its stability, is held at a fairly low temperature (preferably chilled) to suppress homogeneous nucleation. The solution may be agitated by sonication, shaking or stirring, for example, to keep the solution mixed and in suspension. This solution is held in a pressurized tank with the solution outlet tube connected to the nebulizer nozzle. In an example, the fluid flowing is dispersed through a nozzle, which vaporizes the fluid into droplets, which are further subjected to megasonic energy to form smaller droplets which are then directed to the substrate.

In an example, the substrate is heated to a temperature sufficient to cause heterogeneous nucleation of a desired solid phase onto the surface of the substrate. This temperature ranges between 30° C. to 300° C.

The precursors for Turbo SPEED deposition are preferably the nitrate, acetate, sulphate, or chloride salt of the metal or metals of interest, and thiourea or selenourea or the combination of the two for S or Se source respectively, urea for O source, phosphoric acid for $PO_4$ source. The solvent is preferably deionized water with 10 to 90% ethanol, acetone, or other suitable organic solvent. The presence of organic solvent serves to further ensure that the reagent mist droplet sizes are preferably less than 50 micrometers and more preferably less than about 20 micrometer from the nebulizing nozzle.

The precursors for Turbo SPEED deposition are preferably reagent solution comprises the salt of the metal or metals of interest, at least two ligands, and thiourea or selenourea as the S or Se source, urea for O source, phosphoric acid for $PO_4$ source in the deionized water medium at the appropriate pH. Growth takes place on the substrate held at temperature that is preferably more than about 100 Degrees Celsius.

Some specific examples that follow will provide a fuller understanding of the invention with particular emphasis on its application to battery and other semiconductor devices.

Some material films for which the inventive technique may be used include the following in any stoichiometry: $LiAlGaSPO_4$, $LiCoO_2$, FeS, CuS, $Al_2O_3$, ZnO, $SnO_2$, $LiMn_2O_4$, Cu, Sn, Fe, CdS, CuSbS, CuSbSSe, CuInSSe, CuSnZnSe, CuInGaSSe, CuInGaS, CuAlS, CuAlSSe, CuFeS, CuFeSSe, CuLiS, CuLiSSe, CuGaS, CuGaSSe, CuSnS, CuSnSSe, CuZnS, CuZnSSe, CuAlMgS, CuAlMgSSe, CuCdS, CuCdSSe, CuCdSnS, CuCdSnSSe, etc. Through routine experimentation the skilled artisan can modify the various recipes and procedures taught herein to accommodate other metals, adding them for example as nitrates, chlorides, acetates, sulfates, halides, salts, or other soluble species.

Figure 1:
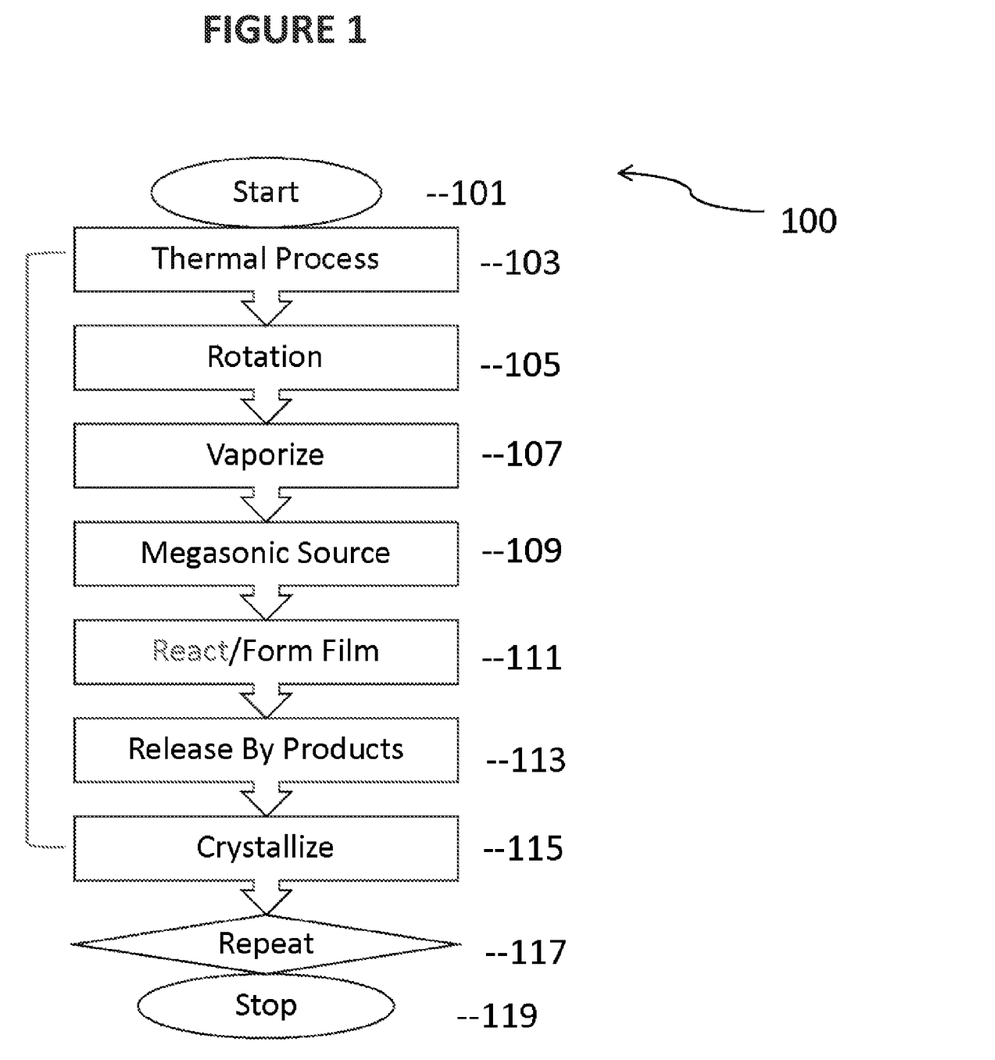
Figure 2:
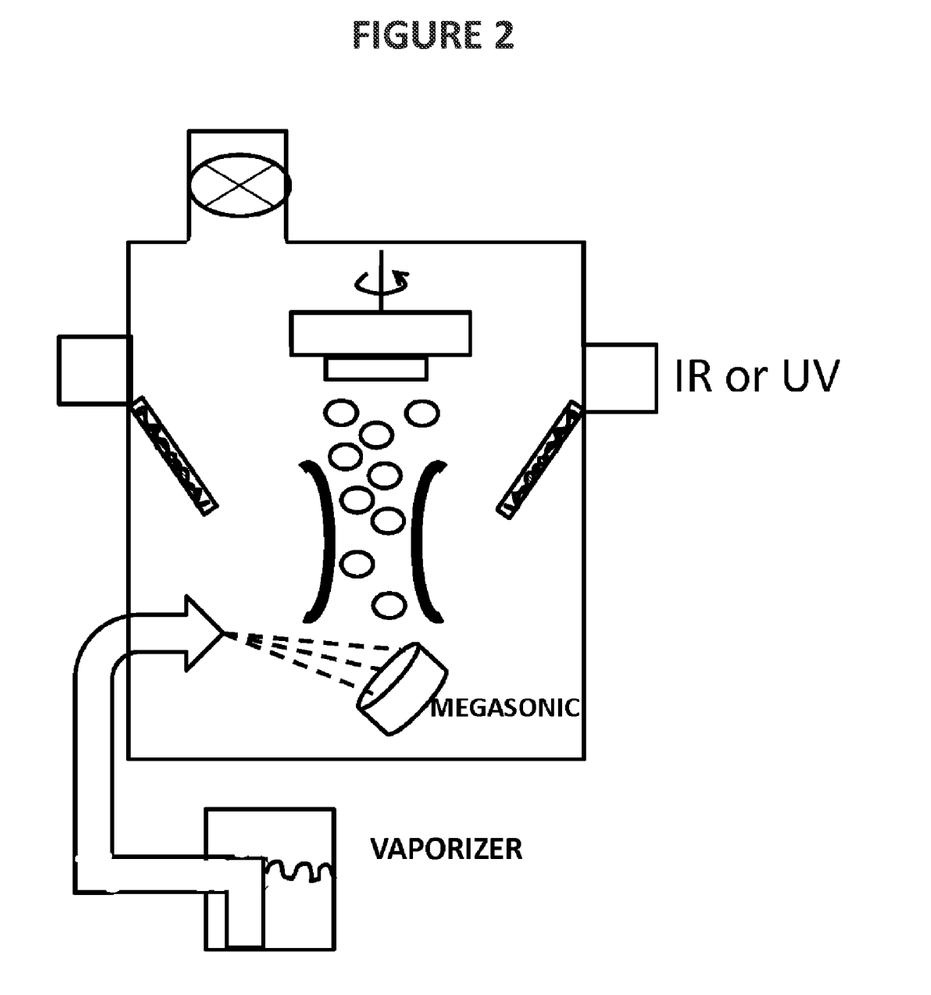
Figure 3:
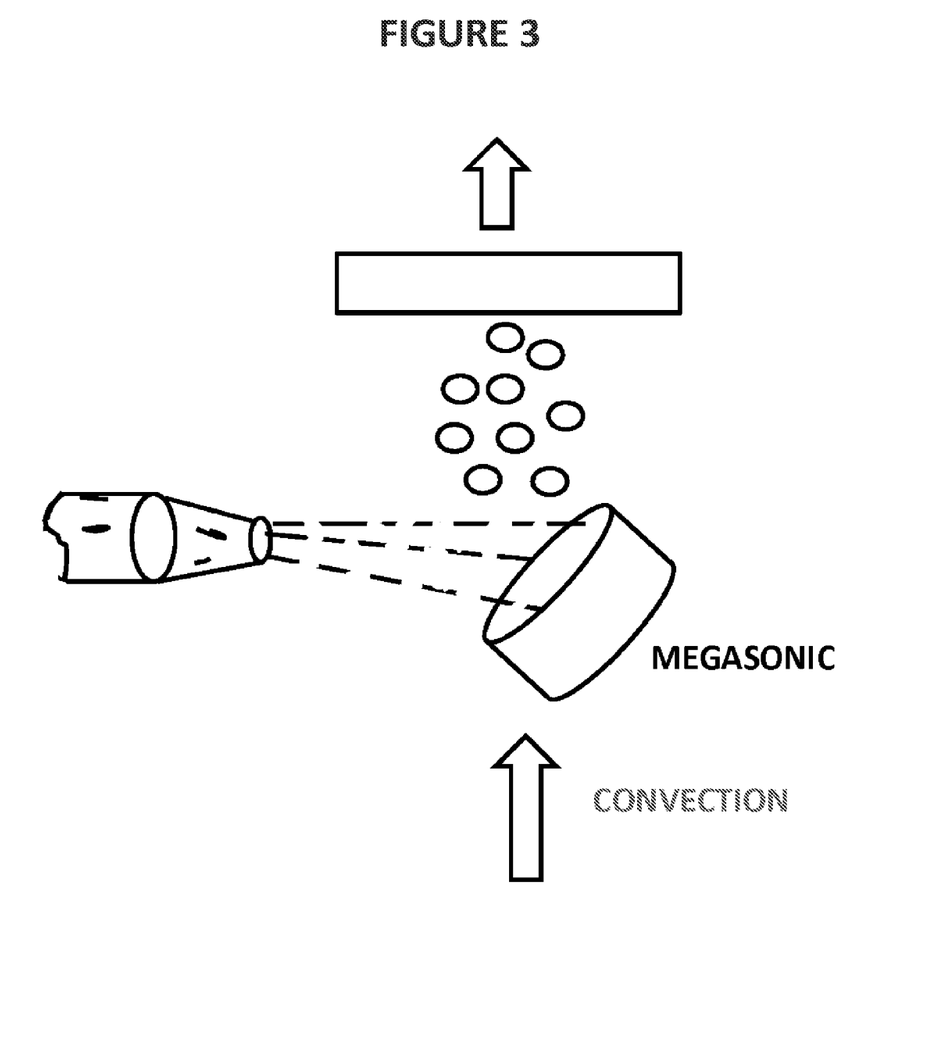
Figure 4:
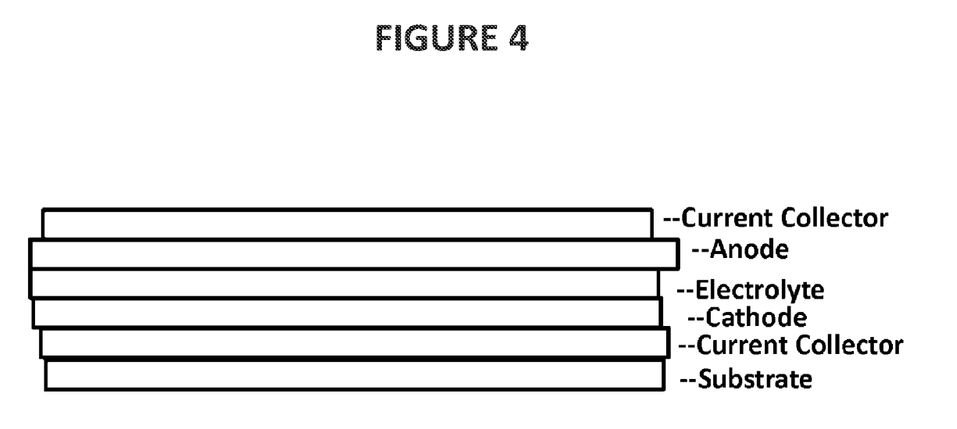

FIG. 4 is a simplified cross-sectional view of a battery device according to an embodiment of the present invention. As shown, the device has a substrate, current collector, cathode region, electrolyte region, anode region, and current collector region, among others.

EXAMPLE

In this example, the present techniques demonstrated a break-through in the creation of large-surface-area inorganic films without the use of vacuum deposition. In an example, the process bridges the gap between chemical bath deposition, and chemical vapor deposition, and involves multiple advances. The first is generation of 0.25 to 5 microns aqueous reaction solution droplets through a cascade of nebulization. The second is supplying the energetics of the reaction through localization of the electrochemistry. The third is achieving thermal activation at about 100° C. at near atmospheric conditions. The fourth is the layer-by-layer film deposition and recrystallization for high film quality.

For example, various systems are described in U.S. Pat. No. 7,793,611, issued 14 Sep. 2010, titled "Film Growth System and Method," U.S. Pat. No. 8,225,744, issued 24 Jul. 2012, titled, "Method for Fabricating Copper Containing Ternary and Quaternary Chalcogenide Thin Films", and U.S. patent application Ser. No. 12/798,510, filed 6 Apr. 2010, titled "Solid State Electrolyte Having High Lithium Ion Condution" which are incorporated by reference herein for all purposes.

As background, "SPEED" aqueous-based deposition process deposits self-assembled nanomaterial inorganic thin films over large areas, without a vacuum. The use of SPEED to produced operational solar cells with 10+% efficiency, bio-sensors, and solid-state electrolyte for batteries has been demonstrated. Growth rates are up to 1,000 nm/minute at relatively low temperatures on hydrophilic stiff or flexible substrates. In an example, three SPEED deposition techniques are included. The three techniques include:

Liquid-Phase SPEED (LPSPEED); where the heated substrate has a controlled liquid precursor covering it with a controlled replenishment and recirculation process. The LPSPEED process grows film at a rate ranging from 10 to 100 nanometers per minute.

Vapor-Phase SPEED (VPSPEED); where precursor droplets on the order of 10 to 20 micrometers are generated and impinge on the heated substrate surface. The VPSPEED process offers higher growth rates, reaching more than 100 nanometers per minute.

Gel Phase SPEED (GPSPEED); where the precursor impregnated in a gel is cast on a heated substrate. The GPSPEED process grows film at a rate much higher than 1,000 nanometers per minute.

As an example, the automated VPSPEED system and the semi-automated LPSPEED system have been provided to grow more than 50 different material films. In an example, the preferred growth medium is deionized water. The aqueous solution includes water-soluble compounds with complexing agents mixed to discourage unwanted homogeneous reactions and to ensure that film growth takes place only by heterogeneous reaction on the substrate. The substrate is maintained at temperature ranging from 25° C. to 300° C. The substrate needs to be hydrophilic, to enable the controlled hydroxyl ions (OH) in the growth bath (LPSPEED), droplet (VPSPEED) or gel (GPSPEED) to adhere to the substrate. The $OH^-$ attachment sites on the substrate are the nucleation sites, with more than $10^{12}$ of these sites per square centimeter. The heterogeneous reactions that eventually will lead to the formation of the desired film deposition occur only if the substrate temperature supplies at least the activation energy necessary for the reaction. The grain size is dictated by the density of nucleation sites on the surface. The grain size of the as-deposited film is typically 50 to 100 nanometers in diameter. The deposited films can be amorphous or nano-crystalline upon deposition. Post growth thermal annealing can be used to further evolve the microstructure.

The SPEED technology implements four key concepts. 1) The use of ligands to prevent premature reactions. 2) The creation of nucleation sites on the substrate facilitated by the hydrophilicity of the substrate and water as the growth medium. 3) The management of the activation energy that leads to the formation of the thin films. 4) The control of the reactant concentration in the solution.

To understand the process better, below is a description of the deposition of CdS using LPSPEED. A water-soluble Cd salt produces $Cd^{2+}$ ions in the solution, with the appropriate water soluble ligand (L) that will bind the $Cd^{2+}$ ion into a complex, as shown in equation (1).

$$Cd^{2+} + nL^{p+} \Rightarrow [CdL_n]^{p+(2+)} \quad (1)$$

This complex prevents the Cd from going into any premature reaction.

The $OH^-$ ions in solution attach to the hydrophilic substrate to form a nucleation site where a metastable $Cd(OH)^+$ is formed as shown in equation (2)

$$[substrate]OH^- + [CdL_n]^{p+(2+)} \rightarrow [substrate]Cd(OH)^+ + nL^p \quad (2)$$

A water-soluble source of sulfur (S) is also added to the solution that forms ions of HS which are hydrolyzed by the $Cd(OH)^+$ nuclei to form CdS, as shown in equation (3)

$$[substrate]Cd(OH)^+ + HS^- \rightarrow [substrate]CdS + H_2O \quad (3)$$

The formation of CdS molecules attached to the substrate leads to site regeneration and attachment of new $OH^-$ ions to this molecule, for a new process cycle. This process is a heterogeneous layer-by-layer deposition of the film on the substrate.

The reaction that limits this growth process is that of equation (2). This reaction depends on the stability constant of the $[CdL_n]^{p+(2+)}$ complex which determines the activation energy of the reaction. It is been shown elsewhere, that if the stability constant (K shown in equation (4)) of this complex is $10^{-7}$, the activation energy that leads to the formation of CdS film is supplied by the substrate at about 100° C.

$$K = \frac{[Cd^{2+}].[L^p]^n}{[[CdL_n]^{p+(2+)}]} \quad (4)$$

It is only the layer of the reactant solution next to the heated surface that is needed for the reaction. In VPSPEED, a water based precursor is nebulized into 10 to 20 um droplets and made to impinge on the heated substrate. The substrate is maintained at about 200° C. for several reasons. (1) To increase the film growth rate, (2) to increase the number of materials that can be grown by SPEED, and (3) to provide sufficient energy needed to decompose and volatilize the by-products. It is important to control the time provided for the decomposition and evacuation of these by-products before the arrival of the next batch of droplets or the film can become porous. Even with the best control of the spray period, the deposited film still has some low level porosity, primarily due to 10 to 20 microns droplet sizes, which do not quite provide the layer-by-layer deposition condition.

In this example, the technique called TURBO-SPEED, is a different version of SPEED that addresses the temperature, porosity limitations, and overall film quality of VPSPEED described above. The technique in TURBO-SPEED will be:
1. TURBO-SPEED will use a rotating heat platen capable of heating the substrate from 25 to 300° C.
2. The reactor will use infrared lamp irradiation, or UV lamp irradiation, or a low-pressure low-frequency plasma operating at room temperature.
3. The droplet size distribution will be reduced an order of magnitude (~1 micron) relative to the VPSPEED droplet size, by using nebulization cascade.
4. Precursor vessels will be temperature controlled.
5. Droplet impingement velocity will be greatly reduced relative to the VPSPEED velocity, while droplet flux density will be increased.
6. To ensure layer-by layer deposition of higher quality films the deposition will have alternating film growth steps and light irradiation steps.

The TURBO-SPEED has been demonstrated through side-by-side comparisons against a CVD system. In an example, the TURBO-SPEED deposits the same material on the same type of substrates to compare the pairs of samples for porosity, adhesion, uniformity, film thickness, optical and electrical properties, and other metrics of film quality and functional equivalence.

In addition, TURBO-SPEED is provided to demonstrate the deposition of graphene and diamond thin films. These aqueous based precursors are very suitable for the SPEED growth mechanism. The graphene oxide aqueous solution comprises of $C_x(OH)_n$ species, which are analogous to $Cd(OH)^-$ of equation (3). These ions are readily adsorbed onto the hydrophilic substrate, where they are reduced to form carbon film with surface regeneration for the next reaction cycle. Before the next cycle the film is subjected to irradiation to form graphene film. SPEED is known for this heterogeneous layer-by-layer growth mechanism.

Although numerous examples of the invention have been illustrated and described, the invention is not so limited. Numerous modifications, variations, substitutions and equivalents will occur to those skilled in the art without departing from the spirit and scope of the present invention.

While the above is a full description of the specific embodiments, various modifications, alternative constructions and equivalents may be used. In an example, the present technique can be provided in a cluster tool, reel to reel, or other apparatus. Therefore, the above description and illustrations should not be taken as limiting the scope of the present invention which is defined by the appended claims.

What is claimed is:
1. A method for manufacturing thin films for a battery device, the method comprising:
 providing a substrate member, the substrate member comprising a surface region;
 subjecting the substrate member to a thermal process to increase a temperature of the substrate from a first temperature to a second temperature;
 vaporizing a precursor material from a liquid source to form droplets ranging from 10 microns to 20 microns; and thereafter subjecting the droplets from 10 microns to 20 microns to a mega-sonic energy source to cause formation of a plurality of smaller droplets ranging from 0.25 micron to 5 microns to cause formation of a film of material overlying the surface region;

releasing any volatile byproducts from the film of material to substantially free the film of material from any of the volatile byproducts, the film of material being characterized by an initial grain size of 50 nm to 100 nm;

heating the film of material using a thermal energy to process the film to cause a recrystallization of the film to form larger sized crystalline materials characterized by a grain size of 0.5 micron to 5 microns.

2. The method of claim 1 wherein the substrate member is selected from a plastic, metal, semiconductor, insulator, or any combination thereof; wherein the thermal energy is provided by irradiation; and wherein the vaporizing, releasing, and heating are provided on a reel to reel apparatus; and further comprising sequentially performing the vaporizing, releasing, and heating to build up a thickness of the film of material.

3. The method of claim 1 further comprising moving the substrate during formation of the film of material; wherein the movement is a constant rotation, a variable rotation, or a linear movement.

4. The method of claim 1 wherein the formation of the film is provided by a heterogeneous chemical reaction between the smaller droplets and a portion of the surface region.

5. The method of claim 1 wherein the formation of the film is provided within a vacuum environment.

6. The method of claim 1 wherein the vaporizing a precursor material to form droplets ranging from 10 microns to 20 microns is provided in a first chamber; wherein subjecting the droplets from about 10 microns to about 20 microns to a mega-sonic energy source is provided in a second chamber; wherein the thermal energy comprises irradiating the film of material using thermal energy to process the film to cause a recrystallization of the film to form larger sized crystalline materials is provided in a third chamber; and wherein the first chamber, the second chamber, and the third chamber are configured in a clustertool.

7. The method of claim 1 wherein the film of material is for an electrolyte device.

8. The method of claim 7 wherein the electrolyte device is a solid state material comprising lithium, aluminum and/or gallium, sulfur, and phosphate entities.

9. The method of claim 1 wherein the film of material comprises a ZnO, ZnS, or a diamond like coating.

10. The method of claim 1 wherein the film of material has a thickness of 10 nm to 100 nm.

11. The method of claim 1 wherein the second temperature is room temperature to 300° C.

12. The method of claim 1 wherein the vaporizing is provided by a nozzle configured with a gas source to facilitate vaporization of the precursor material; and further comprising directing the vaporized precursor material to a surface coupled to the mega-sonic energy source.

13. The method of claim 1 wherein the vaporizing is provided by a nozzle configured with a gas source to facilitate vaporization of the precursor material; and further comprising directing the vaporized precursor material to a cone shaped surface coupled to the mega-sonic energy source.

14. The method of claim 1 wherein the vaporizing is provided by a nozzle configured with a gas source to facilitate vaporization of the precursor material; and further comprising directing the vaporized precursor material to a cone shaped surface coupled to the mega-sonic energy source; and further comprising subjecting the smaller droplets to a convective force to evenly deposit the film of material overlying the surface region of the substrate member.

15. A method for manufacturing thin films for a battery device, the method comprising:

providing a substrate member, the substrate member comprising a surface region;

subjecting the substrate member to a thermal process to increase a temperature of the substrate from a first temperature to a second temperature;

subjecting the substrate member to movement about a center region of the substrate in a variable or constant manner;

injecting a vaporized precursor material from a liquid source to form droplets ranging from 10 microns to 20 microns;

subjecting the droplets to a mega-sonic energy source to cause formation of a plurality of smaller droplets ranging from 0.25 micron to 5 microns to cause formation of a mist comprising the smaller droplets;

subjecting the mist comprising the smaller droplets to a convective force to cause formation of a film of material overlying the surface region of the substrate member;

ceasing the formation of the film material;

releasing any volatile byproducts from the film of material to substantially free the film of material from any of the volatile byproducts, the film of material being characterized by an initial grain size of 50 nm to 100 nm;

irradiating the film of material using electromagnetic radiation to process the film to cause a recrystallization of the film to form larger sized crystalline materials characterized by a grain size of 0.5 micron to 5 microns; and sequentially performing the injecting, subjecting the droplets, subjecting the mist, ceasing, releasing, and irradiating to build up a thickness of the film of material.

16. The method of claim 15 wherein the substrate member is selected from a plastic, metal, semiconductor, insulator, or any combination thereof.

17. The method of claim 15 wherein the movement is a constant rotation or a variable rotation.

18. The method of claim 15 wherein the formation of the film is provided by a heterogeneous chemical reaction between the smaller droplets and a portion of the surface region.

19. The method of claim 15 wherein the formation of the film is provided within a vacuum environment.

* * * * *